United States Patent
Diekevers et al.

(10) Patent No.: US 7,959,239 B2
(45) Date of Patent: Jun. 14, 2011

(54) TRACK ASSEMBLY HAVING WEAR INHIBITING CONTACT MEMBERS

(75) Inventors: Mark Steven Diekevers, Metamora, IL (US); Eric James Johannsen, Washington, IL (US); Richard Edward Livesay, Peoria, IL (US); Kevin Lee Steiner, Tremont, IL (US)

(73) Assignee: Caterpillar Inc., Peoria, IL (US)

( * ) Notice: Subject to any disclaimer, the term of this patent is extended or adjusted under 35 U.S.C. 154(b) by 58 days.

(21) Appl. No.: 12/076,907

(22) Filed: Mar. 25, 2008

(65) Prior Publication Data
US 2009/0243384 A1    Oct. 1, 2009

(51) Int. Cl.
*B62D 55/21* (2006.01)
(52) U.S. Cl. .................. 305/104; 305/106; 305/202
(58) Field of Classification Search .................. 305/102, 305/103, 104, 105, 106, 200, 201, 202, 59
See application file for complete search history.

(56) References Cited

U.S. PATENT DOCUMENTS

| | | | |
|---|---|---|---|
| 3,492,054 A | 1/1970 | Boggs et al. | |
| 3,958,836 A * | 5/1976 | Brown et al. | 305/118 |
| 4,265,084 A * | 5/1981 | Livesay | 59/7 |
| 4,295,654 A * | 10/1981 | Kawamura et al. | 277/380 |
| 4,324,437 A * | 4/1982 | Narang | 305/106 |
| 4,568,090 A * | 2/1986 | Westemeier | 305/103 |
| 4,594,846 A | 6/1986 | Livesay et al. | |
| 5,183,318 A | 2/1993 | Taft et al. | |
| 6,102,408 A | 8/2000 | Anderton et al. | |
| 6,206,491 B1 | 3/2001 | Hisamatsu | |
| 6,371,577 B1 | 4/2002 | Hasselbusch et al. | |
| 6,382,742 B1 | 5/2002 | Hasselbusch et al. | |
| 6,386,651 B1 | 5/2002 | Gerardin et al. | |
| 6,457,304 B1 | 10/2002 | Bedford et al. | |
| 6,478,388 B2 | 11/2002 | Maguire | |
| 6,564,539 B2 * | 5/2003 | Bedford et al. | 59/7 |
| 6,739,680 B2 | 5/2004 | Hasselbusch et al. | |
| 6,783,196 B2 | 8/2004 | Maguire et al. | |
| 6,846,051 B2 | 1/2005 | Bottom et al. | |
| 6,955,359 B2 | 10/2005 | Yamamoto et al. | |
| 7,121,555 B2 | 10/2006 | Yamamoto et al. | |
| 7,240,973 B2 | 7/2007 | Takayama | |
| 7,325,889 B2 | 2/2008 | Yamamoto et al. | |
| 2003/0111905 A1 * | 6/2003 | Takayama | 305/202 |
| 2005/0040708 A1 | 2/2005 | Yamamoto et al. | |
| 2006/0284485 A1 | 12/2006 | Johannsen et al. | |
| 2007/0126287 A1 | 6/2007 | Takayama | |

OTHER PUBLICATIONS

Mark Steven Diekevers et al., U.S. Appl. No. 11/975,206, filed Oct. 18, 2007.

* cited by examiner

*Primary Examiner* — Russell D Stormer
(74) *Attorney, Agent, or Firm* — Finnegan, Henderson, Farabow, Garrett & Dunner LLP

(57) ABSTRACT

A track assembly for a track-type machine is disclosed. The track assembly includes inner and outer track links. A rotatable bushing is positioned about a track pin and a sleeve bearing is positioned about the track pin. A first seal member is disposed between an inner track link and the rotatable bushing and a second seal member is disposed between inner and outer track links. A first thrust ring is engaged with the rotatable bushing and a second thrust ring is engaged with the sleeve bearing. A first contact member is engaged with the first seal member and a second contact member is engaged with the second seal member. The first and second contact members are configured to inhibit wear of the first and second seal members.

19 Claims, 5 Drawing Sheets

TRACK ASSEMBLY HAVING WEAR INHIBITING CONTACT MEMBERS

TECHNICAL FIELD

The present disclosure is directed to a track assembly, and more particularly, to a track assembly having wear inhibiting contact members.

BACKGROUND

Track-type or crawler-type machines may be employed in construction, mining, oil, gas, and forestry operations, and in other rugged operating environments. These machines employ tracks which engage the ground and enable the machine to move about and over relatively rough terrain. Typical track designs include a track pin, either rotatably engaged or fixed to a pair of track chain assemblies, and a bushing rotatably positioned between the track chain assemblies. The tracks may operate in adverse environments in which track joints may be exposed to various abrasive mixtures of water, dirt, sand, rock, and/or chemical elements and to wide temperature ranges varying from high heat in deserts to extreme cold in arctic regions. Seals may be placed in the track joints in a variety of configurations and positions to ensure that contaminants are effectively excluded and lubrication effectively retained.

Over the course of many hours of operation, the constant contact among the moving track components may result in significant wear, even where bearings and lubricating oil are used to reduce friction among the components. Galling and other wear related problems tend to be particularly prevalent with relatively large track-type machines, which may subject the track components to substantial loads. In particular, wear and galling of the seals and the track pins are problematic.

One method for improving the component life of track components is described in U.S. Pat. No. 6,206,491 (the '491 patent) to Hisamatsu, issued on Mar. 27, 2001. The '491 patent describes a crawler device comprising a pin and a stationary bush for connecting a right row of crawler links and a left row of crawler links, and a rotating bush outwardly fitted to the stationary bush in a freely rotatable manner. Support members are inserted to the right and left rows of the crawler links, a first seal is inserted between an outer end portion of each of the support members and the opposing crawler links, and a second seal is inserted between an inner end portion of each of the support members and both end portions of the opposing rotating bushes. A clearance of the first and second seals can maintain the initial value at assembly against an external force during an operation. The lubricating oil is sealed in the pin and does not leak from the first and second seals, so that the durability of the seals and crawler device are improved.

Although the crawler device of the '491 patent may improve the durability of some components of the crawler device, it may have limitations. For example, the first and second seals may still undergo wear even in the presence of lubricating oil. Contact between the seals and the crawler links may eventually wear down the seals, resulting in costly repairs and replacements.

The track assembly of the present disclosure is directed towards improvements to the existing technology.

SUMMARY OF THE DISCLOSURE

One aspect of the present disclosure is directed to a track assembly for a machine. The track assembly may include a track having a first chain assembly and a second chain assembly coupled with the first chain assembly via a track pin, the first and second chain assemblies including an inner track link and an outer track link. The track assembly may also include a rotatable bushing positioned about the track pin, a sleeve bearing disposed within a first bore of the inner track link and positioned about the track pin, a first seal member disposed between the inner track link and the rotatable bushing, a second seal member disposed between the inner and outer track links, a first thrust ring positioned about the track pin and engaged with the rotatable bushing, a second thrust ring disposed about the track pin and engaged with the sleeve bearing, a first contact member engaged with the first seal member, and a second contact member engaged with the second seal member, the first and second contact members configured to inhibit wear of the first and second seal members.

Another aspect of the present disclosure is directed to a method of protecting components of a machine track assembly during operation, the machine track assembly including an outer track link, an inner track link, a track pin, a rotatable bushing positioned about the track pin, a first seal member disposed between the inner track link and the rotatable bushing, and a second seal member disposed between the inner and outer track links. The method may include disposing a sleeve bearing about the track pin. The method may also include protecting the first and second seal members at least in part by assembling a first thrust ring about the track pin and engaging the first thrust ring with the rotatable bushing, assembling a second thrust ring about the track pin and engaging the second thrust ring with the sleeve bearing, engaging a first contact member with the first seal member, and engaging a second contact member with the second seal member.

DETAILED DESCRIPTION

Figure 1:
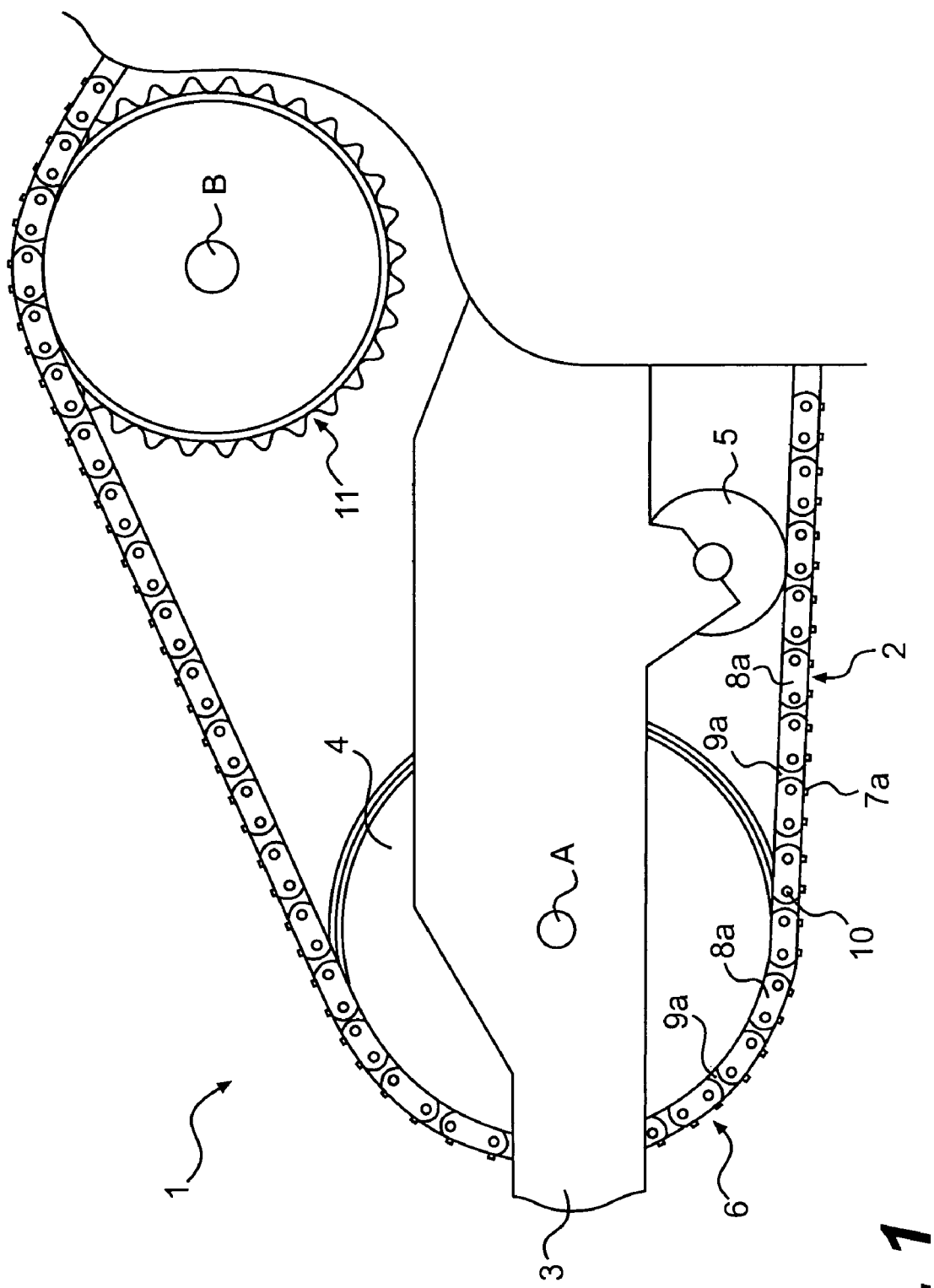
FIG. 1 is a side diagrammatic view of a portion of a track-type machine.

A portion of machine 1 according to the present disclosure is shown in FIG. 1. Machine 1 is shown in the context of a track-type machine having a ground engaging track 2, mounted at a first side of a frame 3, and also including a second ground engaging track identical to track 2 and positioned at a second side of frame 3 but not shown in FIG. 1. Track 2 extends about a plurality of rotatable track engaging elements, including an idler 4 having an axis of rotation A, a drive sprocket 11 having an axis of rotation B, and a plurality of track rollers 5. Machine 1 may also include other rotatable track engaging elements coupled with each of its one or more tracks, such as an additional idler. While only a single track is shown in FIG. 1, the present description of track 2 and track assembly 6 of which it is a part should be understood to refer also to a second track and associated track assembly 6 of machine 1. While machine 1 may be a track-type machine such as a track loader, an excavator, a tractor, or another mobile machine, the present disclose is not thereby limited. In other embodiments, track assembly 6 may include a portion of a machine such as a conveyor. In all embodiments contemplated herein, track assembly 6 will be configured such that certain types of wear, for example, wear affecting track seals and track pins as described herein, will be reduced or eliminated as compared with current technology.

Track 2 will typically comprise two parallel track chain assemblies, one of which is shown in FIG. 1 and identified with reference numeral 7a, extending in parallel and coupled together via a plurality of track pins 10. In the illustrated embodiment, chain assembly 7a may include a plurality of outer track links 8a alternating with a plurality of inner track links 9a.

Figure 2:
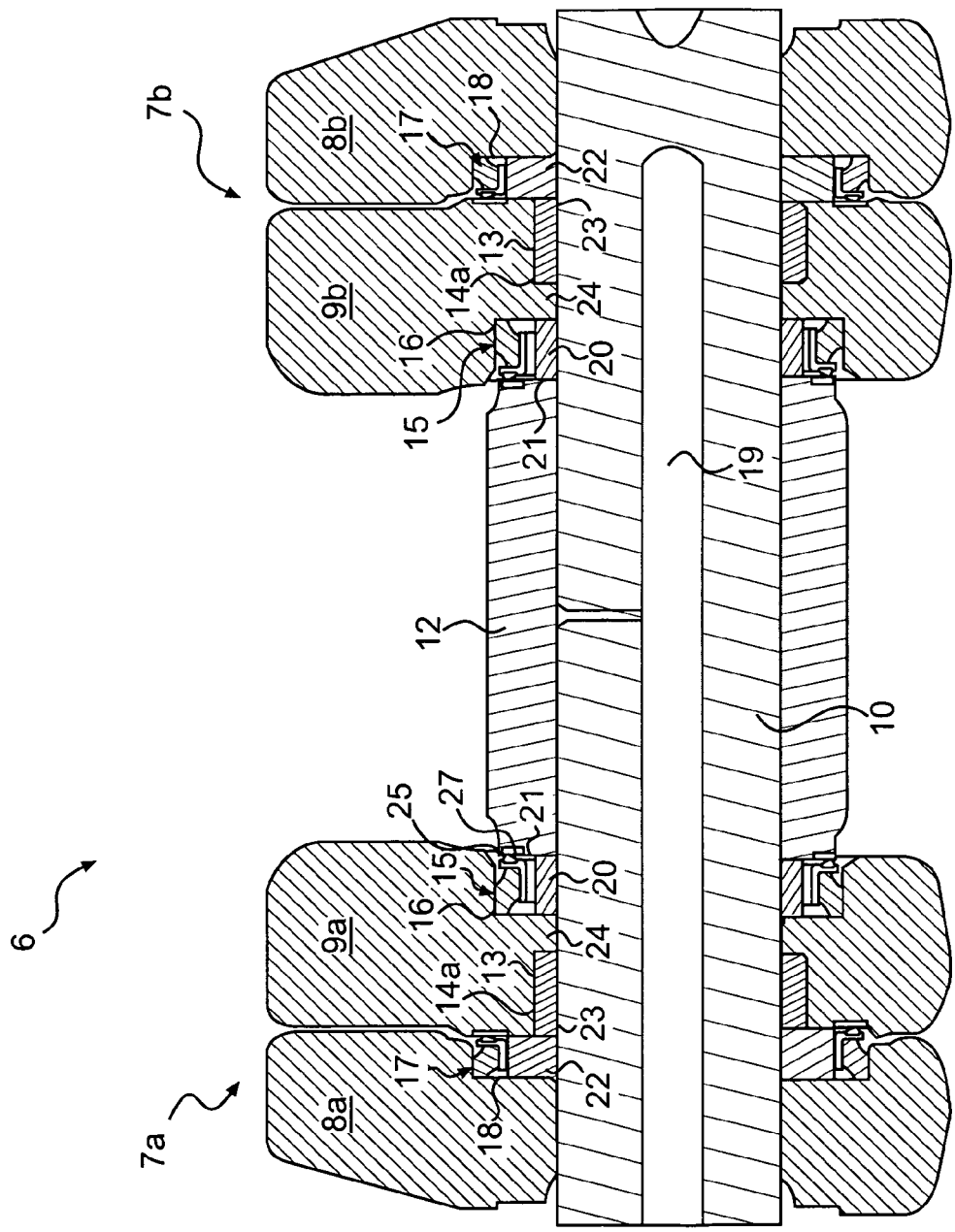
FIG. 2 is a diagrammatic cross-section of a track assembly for a track-type machine.
Figure 3:
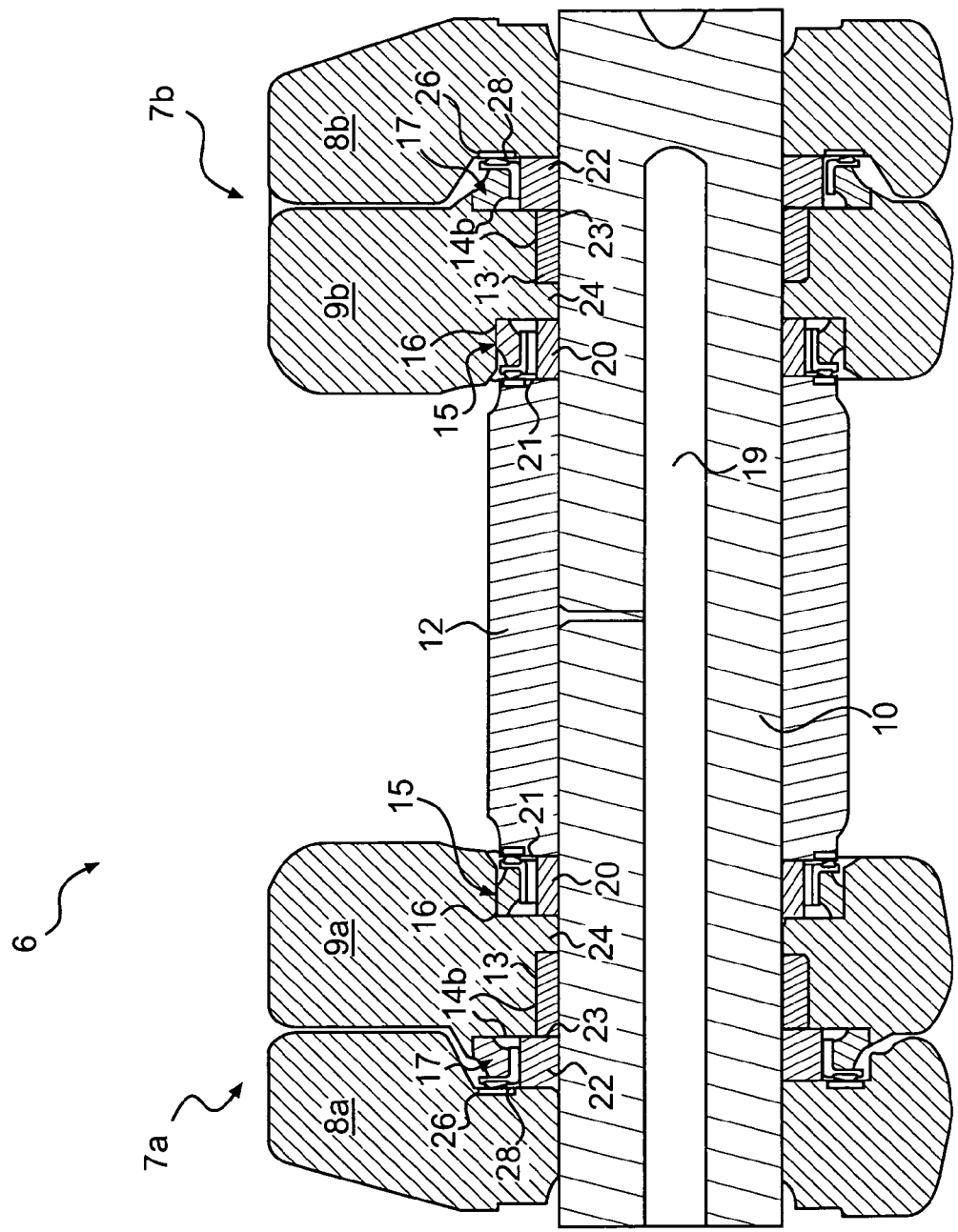
FIG. 3 is a diagrammatic cross-section of another embodiment of a track assembly for a track-type machine.

FIG. 2 and FIG. 3 illustrate a sectioned portion of track assembly 6. A first chain assembly 7a, including inner track link 9a and outer track link 8a, may be positioned on track pin 10, as is a second chain assembly 7b, also including an inner track link 9b and an outer track link 8b. A rotatable bushing 12 may be positioned and rotate about track pin 10 and between inner track links 9a, 9b. A sleeve bearing 13 may be disposed within a first bore 14a (shown in FIG. 2) or a first bore 14b (shown in FIG. 3) of inner track link 9a, 9b. Sleeve bearing 13 may be positioned about track pin 10 so as to prevent galling of track pin 10 by frictional contact from inner track links 9a, 9b. Furthermore, sleeve bearing 13 may enable inner track links 9a, 9b to oscillate about track pin 10. It is contemplated that each of sleeve bearings 13 may be formed from a relatively hard metallic material, such as nitrided steel.

First seal members 15 may be positioned between inner track links 9a, 9b and rotatable bushing 12. A second bore 16 axially aligned with first bore 14a (shown in FIG. 2) and first bore 14b (shown in FIG. 3) of inner track links 9a, 9b may house first seal member 15. A second seal member 17 may be positioned between inner track link 9a and outer track link 8a as well as inner track link 9b and outer track link 8b. As shown in FIG. 2, second seal member 17 may be housed within a bore 18 of outer track links 8a, 8b. In another embodiment, shown in FIG. 3, second seal member 17 may be housed within first bore 14b of inner track links 9a, 9b. First bore 14b may be a two-part bore, wherein an outer portion of first bore 14b may house sleeve bearing 13 and an inner portion may house second seal member 17. Lubricating fluid from cavity 19 may be distributed to various components of track chain assemblies 7a and 7b and to rotatable bushing 12. First and second seal members 15, 17 may be annular elastomeric seals and may be configured to fluidly seal the lubricating fluid from escaping track chain assemblies 7a and 7b and exclude contaminants from entering track chain assemblies 7a and 7b.

Figure 4:
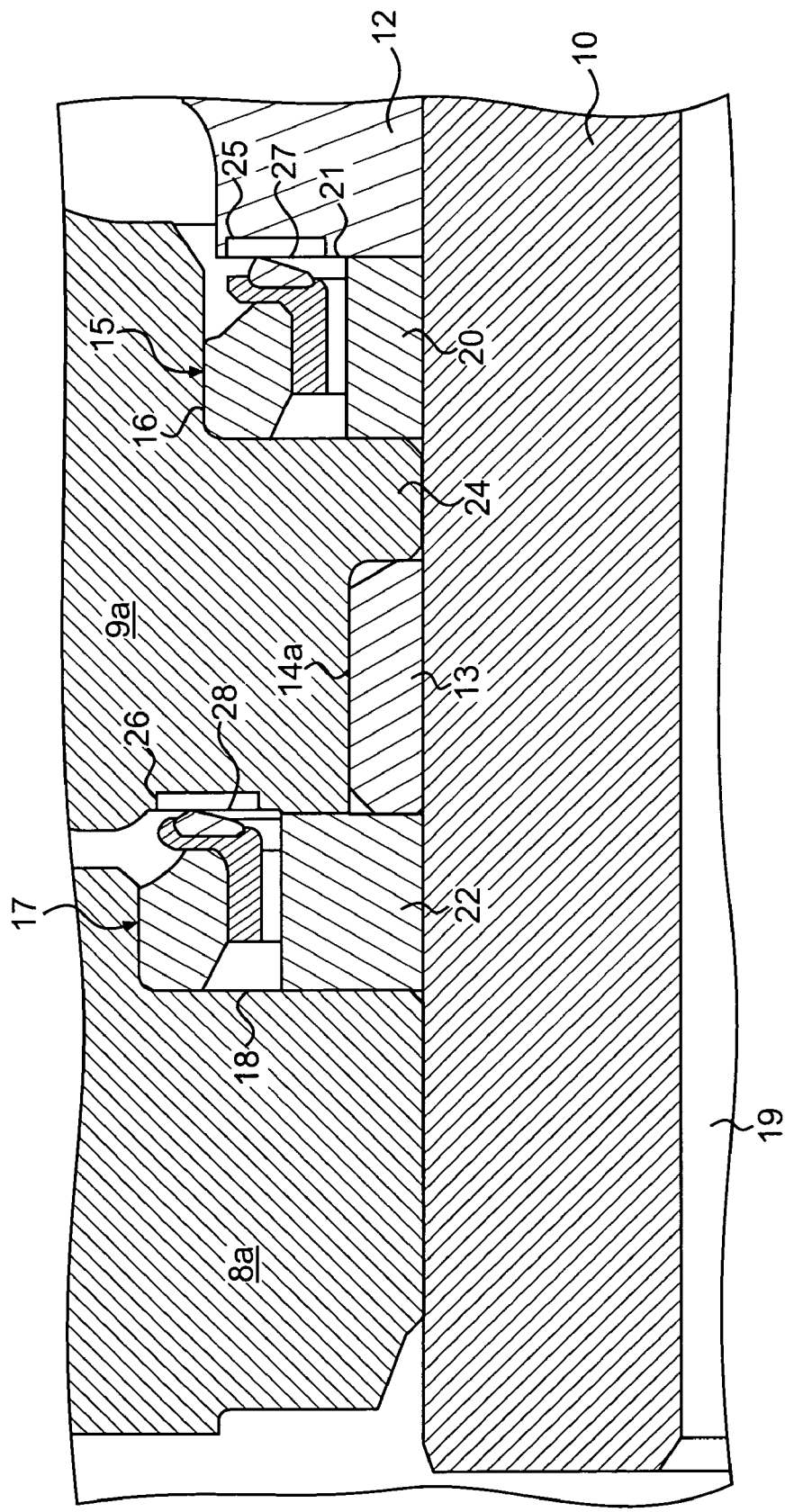
FIG. 4 is a partial diagrammatic cross-section of a track assembly for a track-type machine.
Figure 5:
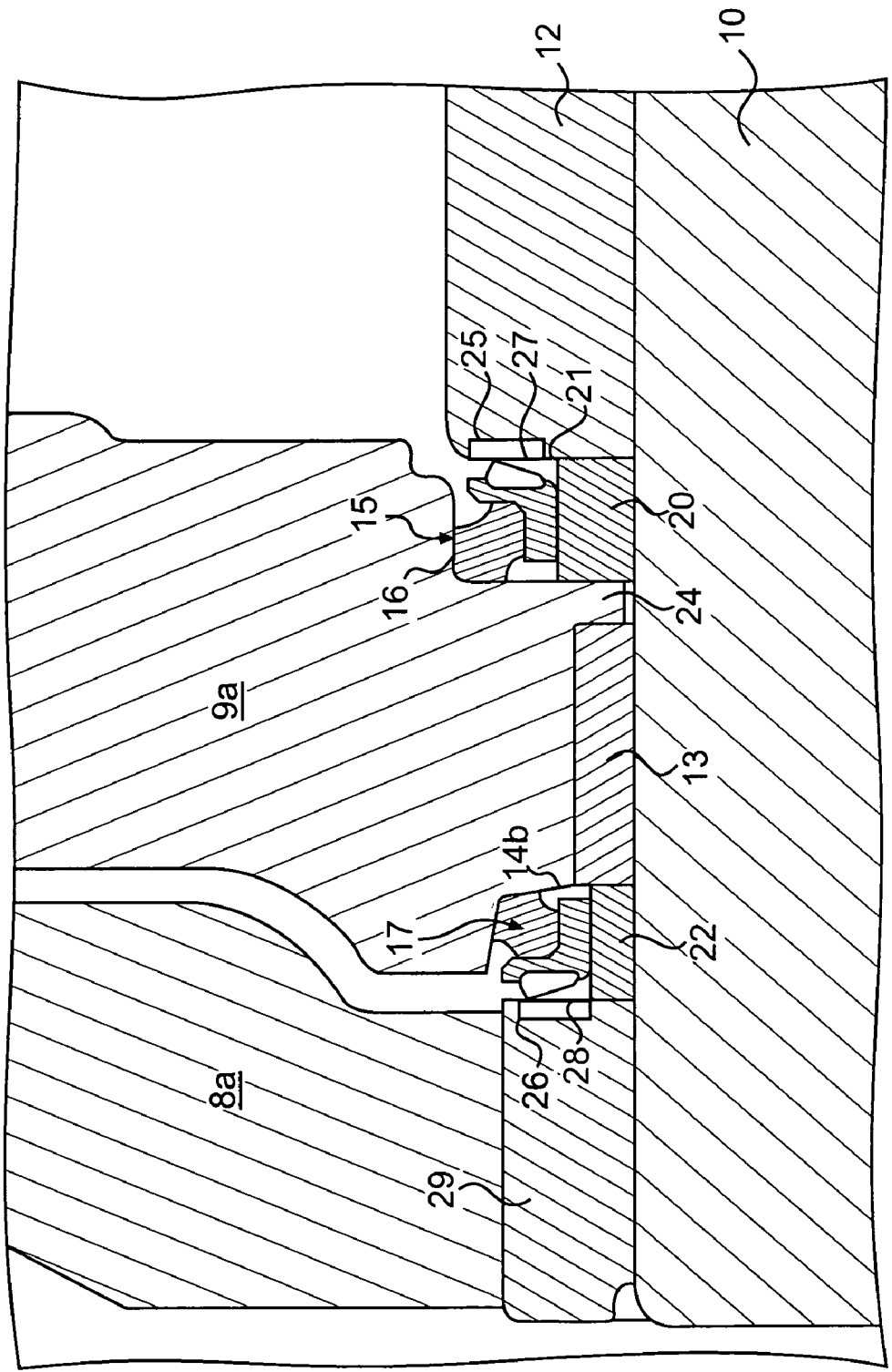
FIG. 5 is a partial diagrammatic cross-section of another embodiment of a track assembly for a track-type machine.

First thrust ring 20 may be disposed about track pin 10 and engaged with rotatable bushing 12. As shown in FIG. 2 and FIG. 3, first thrust ring 20 may be housed within second bore 16 of inner track links 9a, 9b. First thrust ring 20 may be configured to push against an end face 21 of rotatable bushing 12 and shoulder 24 formed by first bore 14a and second bore 16 (shown in FIG. 2) or first bore 14b and second bore 16 (shown in FIG. 3) so as to limit relative movement in the axial direction of rotatable bushing 12 and reduce compression on first seal member 15. Second thrust ring 22 may be disposed about track pin 10 and engaged with sleeve bearing 13. As shown in FIG. 2, second thrust ring 22 may be housed within bore 18 of outer track links 8a, 8b and configured to push against an end face 23 of sleeve bearing 13 and an end face of bore 18 so as to reduce compression on second seal member 17. In another embodiment, shown in FIG. 3, second thrust ring 22 may be housed within first bore 14b of inner track links 9a, 9b and configured to push against end face 23 of sleeve bearing 13 and outer track links 8a, 8b so as to reduce compression on second seal member 17. As shown in FIG. 5, second thrust ring 22 may solely be engaged with sleeve bearing 13; however, and as shown in FIG. 2, FIG. 3, and FIG. 4, second thrust ring 22 may be engaged with both sleeve bearing 13 and inner track link 9a, 9b. Alternatively, second thrust ring 22 may solely be engaged with inner track link 9a, 9b.

In the exemplary disclosed embodiments of FIG. 4 and FIG. 5, a first contact member 25 may be engaged with first seal member 15 to inhibit wear of first seal member 15, and a second contact member 26 may be engaged with second seal member 17 to inhibit wear of second seal member 17. First and second contact members 25, 26 may be annular members formed of or having surfaces coated or clad with a hardened material configured to be highly corrosion and abrasion resistant, such as, metallic washers.

First contact member 25 may be fastened to end face 21 of rotatable bushing 12, inhibiting direct contact between first seal member 15 and rotatable bushing 12. It should be appreciated that a variety of known means for fastening the first contact member 25 to end face 21 of rotatable bushing 12 may be employed, such as, for example, adhesive sealants, press fittings, and adhesive rubber compounds, and that the particular fastening means employed is beyond the scope of this disclosure. Alternatively, end face 21 may be laser clad, physical vapor deposition coated, or arc welded with an corrosion and abrasion resistant surface. In a compressibly loaded state, a slidable sealing interface 27 may form between first contact member 25 and first seal member 15. The hardened material forming first contact member 25 may maintain the integrity of sealing interface 27. Furthermore, because first contact member 25 may be composed of the extremely hard and abrasion resistant material, contact between first seal member 15 and first contact member 25 may significantly decrease wear of first seal member 15 during operation of track assembly 6, thereby increasing the durability of first seal member 15.

As shown in FIG. 4, second contact member 26 may be fastened to inner track link 9a, inhibiting direct contact between second seal member 17 and inner track link 9a. It should be appreciated that a variety of known means for fastening the second contact member 26 to inner track link 9a may be employed, such as, for example, adhesive sealants, press fittings, and adhesive rubber compounds, and that the particular fastening means employed is beyond the scope of this disclosure. In a compressibly loaded state, a slidable sealing interface 28 may form between second contact member 26 and second seal member 17. The hardened material forming second contact member 26 may also maintain the integrity of sealing interface 28. In the same manner as mentioned above, the extremely hard and abrasion resistant material forming second contact member 26 may significantly decrease wear of second seal member 17 as second seal member 17 and second contact member 26 come into contact during operation of track assembly 6, thereby increasing its durability. Although not shown in FIG. 4, it will be understood that a similar sealing arrangement may be associated with inner track link 9b and outer track link 8b.

In another embodiment shown in FIG. 3, second contact member 26 may be fastened to outer track link 8a, inhibiting direct contact between second seal member 17 and outer track link 8a. Alternatively, as shown in FIG. 5, second contact member 26 may be fastened to a collar 29, inhibiting direct contact between second seal member 17 and collar 29. Collar 29 may be fastened to track pin 10 and configured to axially position thrust rings 22, 20, sleeve bearing 13, inner track link 9a, and rotatable bushing 12. Outer track link 8a may be positioned about collar 29. In the same manner as mentioned above, the extremely hard and abrasion resistant material forming second contact member 26 may significantly decrease wear of second seal member 17 as second seal member 17 and second contact member 26 come into contact during operation of track assembly 6, while also maintaining the integrity of sealing interface 28 between second contact member 26 and second seal member 17. Although not shown in FIG. 5, it will be understood that a similar sealing and collar arrangement may be associated with inner and outer track links 9b, 8b.

INDUSTRIAL APPLICABILITY

The disclosed track assembly 6 may have applicability with track-type machines. For example, and as shown in FIG. 1, track assembly 6 may serve to engage a work surface and enable track-type machine 1 to move about and over terrain.

During operation of track-type machine 1, inner track links 9a, 9b and outer track links 8a, 8b may rotate relative to one another about track pin 10. Rotatable bushing 12 may rotate against idler 4 (shown in FIG. 1) and about track pin 10 as track 2 travels about its path during operation. As rotatable bushing 12 and inner track links 9a, 9b rotate, first contact member 25 fastened to the end faces 21 of rotatable bushing 12 may slidably contact first seal member 15 in a rotating manner. Similarly, as inner track links 9a, 9b and outer track links 8a, 8b rotate relative to one another, a second contact member 26, fastened directly to either inner track links 9a, 9b (as shown in FIG. 4), outer track links 8a, 8b (as shown in FIG. 3), or fastened to collars 29 supporting outer track links 8a, 8b (as shown in FIG. 5), may slidably contact second seal member 17 in a rotating manner. The hardened and abrasion resistant material of first and second contact members 25, 26 may prevent wear and corrosion of first and second seal members 15, 17. Furthermore, assembling sleeve bearing 13 within a first bore 14a (shown in FIG. 2) and first bore 14b (shown in FIG. 3) of inner track links 9a, 9b may transmit radial loads from inner track links 9a, 9b to track pin 10, preventing galling of track pin 10 resulting from frictional contact between the rotation of inner track links 9a, 9b and track pin 10.

When track 2 encounters a side load, e.g. when outer track links 8a, 8b are axially urged toward inner track links 9a, 9b, thrust rings 20, 22 may axially transmit loads across track assembly 6 and further prevent wear of first and second seal members 15, 17. For example, when outer track links 8a, 8b are urged to the left in FIG. 2, the rightmost thrust ring 22 may transmit load to the adjacent sleeve bearing 13 and inner track link 9b. The adjacent sleeve bearing 13 may transmit the load to shoulder 24, which in turn may transmit the load to the adjacent thrust ring 20, and so on in an axial direction, and ultimately to the outer track link 8a on the opposite side. Axial loads may be transmitted through thrust rings 20, 22, preventing compressive loads on first and second seal members 15, 17. Excessive pressure and stress exerted onto first and second seal members 15, 17 may be avoided, thereby, preventing deformation and ultimately crushing of first and second seal members 15, 17.

Assembling first and second contact members 25, 26 to track assembly 6 may improve component life and durability of first and second seal members 15, 17. Abrasion and wear of first and second seal members 15, 17 due to constant frictional contact with track links, bushings, and other components of track assembly 6 may be prevented. Therefore, costly repairs and replacements attributed to the failure of first and second seal members 15, 17 may ultimately be avoided.

It will be apparent to those skilled in the art that various modifications and variations can be made to the track assembly of the present disclosure without departing from the scope of the disclosure. Other embodiments will be apparent to those skilled in the art from consideration of the specification and practice of the embodiments disclosed herein. It is intended that the specification and examples be considered as exemplary only, with a true scope of the disclosure being indicated by the following claims.

What is claimed is:

1. A track assembly for a machine comprising:
a first chain assembly;
a track pin;
a second chain assembly wherein the track pin couples the second chain assembly with the first chain assembly, the first and second chain assemblies each including an inner track link and an outer track link, wherein the inner track link includes a shoulder;
a rotatable bushing positioned about the track pin;
a sleeve bearing disposed within a first bore of the inner track link and positioned about the track pin, wherein the sleeve bearing is disposed to transfer axial loads to the shoulder;
a first seal member disposed between the inner track link and the rotatable bushing;
a second seal member disposed between the inner and outer track links;
a first thrust ring positioned about the track pin and engaged with the rotatable bushing;
a second thrust ring disposed about the track pin and engaged with the sleeve bearing; and
a first contact member engaged with the first seal member and a second contact member fastened to either the inner track link or the outer track link and engaged with the second seal member, the first and second contact members configured to inhibit wear of the first and second seal members.

2. The track assembly of claim 1, wherein the first and second contact members are formed of corrosion and abrasion resistant material.

3. The track assembly of claim 1, wherein the first contact member is fastened to an end face of the rotatable bushing.

4. The track assembly of claim 1, wherein the second contact member is fastened to the inner track link.

5. The track assembly of claim 1, wherein the second contact member is fastened to the outer track link.

6. The track assembly of claim 1, wherein the second seal member is disposed within the first bore of the inner track link.

7. The track assembly of claim 1, wherein the second seal member is disposed within a bore of the outer track link.

8. The track assembly of claim 1, wherein the first seal member is disposed within a second bore of the inner track link, the second bore axially aligned with the first bore.

9. The track assembly of claim 1, wherein the first thrust ring is configured to push against the end face of the rotatable bushing and the second thrust ring is configured to push against an end face of the sleeve bearing.

10. A method of protecting components of a machine track assembly during operation, the machine track assembly including an outer track link, an inner track link, a track pin, a rotatable bushing positioned about the track pin, a first seal member disposed between the inner track link and the rotatable bushing, and a second seal member disposed between the inner and outer track links, wherein the inner track link includes a shoulder, the method comprising:

disposing a sleeve bearing about the track pin, wherein the sleeve bearing is disposed to transfer axial loads to the shoulder; and protecting the first and second seal members at least in part by:

assembling a first thrust ring about the track pin and engaging the first thrust ring with the rotatable bushing;

assembling a second thrust ring about the track pin and engaging the second thrust ring with the sleeve bearing;

engaging a first contact member with the first seal member;

fastening a second contact member to the inner track link or the outer track link; and engaging the second contact member with the second seal member.

11. The method of claim 10, wherein disposing the sleeve bearing about the track pin further includes inserting the sleeve bearing within a first bore of the inner track link.

12. The method of claim 10, wherein engaging a first contact member with the first seal member includes fastening the first contact member to an end face of the rotatable bushing.

13. The method of claim 10, wherein engaging a second contact member with the second seal member includes fastening the second contact member to the inner track link.

14. The method of claim 10, wherein engaging a second contact member with the second seal member includes fastening the second contact member to the outer track link.

15. A track-type machine comprising:
a frame; and
a track mounted on the frame, the track including a first chain assembly;
a plurality of track pins;
a second chain assembly, wherein the plurality of track pins couple the first chain assembly with the second chain assembly, the first and second chain assemblies including a plurality of inner track links and a plurality of outer track links, wherein the inner track links each include a shoulder;
a rotatable bushing positioned about each track pin;
a sleeve bearing disposed within a first bore of each inner track link and positioned about each track pin, wherein the sleeve bearing is disposed to transfer axial loads to the shoulder;
a first seal member disposed between each inner track link and the rotatable bushing;
a second seal member disposed between each inner and outer track link;
a first thrust ring positioned about each track pin and engaged with the rotatable bushing;
a second thrust ring disposed about each track pin and engaged with the sleeve bearing; and
a first contact member engaged with the first seal member and a second contact member engaged with the second seal member, the first and second contact members configured to inhibit wear of the first and second seal members;
wherein the first seal member is coupled to a bore of the inner track link and the second seal member is coupled to a bore of the inner track link.

16. The track-type machine of claim 15, wherein the first contact member is fastened to an end face of the rotatable bushing.

17. The track-type machine of claim 15, wherein the second contact member is fastened to each outer track link.

18. The track-type machine of claim 15, wherein the first thrust ring is configured to push against the end face of the rotatable bushing and the second thrust ring is configured to push against an end face of the sleeve bearing.

19. The track assembly of claim 15, wherein the outer track link is positioned about a collar fastened to the track pin, and the second contact member is fastened to the collar.

* * * * *